Dec. 30, 1969     G. F. CLARKE     3,487,408
ELECTRONICALLY SCANNED STORAGE ARRAY PULSE RADAR SYSTEM
Filed May 24, 1968     3 Sheets-Sheet 2

(a) TRANSMITTED SIGNALS
(b) RECEIVED SIGNALS
(c) RANGE TIME BASE
(d) RESPONSE PULSES (a) RESPONSE PULSES
(b) ELEVATION TIME BASE

United States Patent Office 3,487,408
Patented Dec. 30, 1969

3,487,408
ELECTRONICALLY SCANNED STORAGE ARRAY PULSE RADAR SYSTEM
George Farren Clarke, Farnham, England, assignor to Minister of Technology in Her Britannic Majesty's Government of the United Kingdom of Great Britain and Northern Ireland, London, England
Continuation-in-part of application Ser. No. 520,548, Jan. 12, 1966. This application May 24, 1968, Ser. No. 731,783
Claims priority, application Great Britain, Jan. 13, 1965, 1,588/65
Int. Cl. G01s 7/28, 9/02
U.S. Cl. 343—17.2                11 Claims

ABSTRACT OF THE DISCLOSURE

In a radar system having an array of receiver aerial elements, a plurality of signal channels are each connected to receive signals from separate ones of the receiver aerial elements, and electronic scanning means is connected to the signal channels for producing a scanning effect, a narrow-band resonant circuit is provided in each channel and the electronic scanning means is constructed to provide at least B scans per second, where B is substantially equal to the bandwidth of the radar signals to be received and is also substantially equal to the bandwidth of the said narrow-band resonant circuits.

---

The present application is a continuation-in-part of U.S. patent application Ser. No. 520,548, filed Jan. 12, 1966, now abandoned which will hereinafter be called the parent application.

The present application covers a class of radar systems devised by the applicant and called storage array radars. A particularly useful embodiment of the class was described in the parent application, and will be described again hereinafter.

Modern technical developments are producing an increasing need for radar systems having a high degree of resolution with respect to azimuthal angle, range and elevation measurements, and at the same time having a high data rate—that is to say a comparatively short interval between successive measurements on any given target. These two requirements tend to be incompatible, and in conventional radar systems a compromise between them, or some duplication of apparatus may be needed.

An object of the present invention is to provide a radar system capable of high resolution and at the same time having a high data rate.

To achieve a high data rate, it is obviously desirable to use an electronic scanning system; this implies the use of an array of receiver aerial elements and a means for combining the signals from the aerial elements so as to achieve a scanning effect.

In known conventional radar systems employing receivers with beam-scanning arrangements, the signals reflected from a target are only utilized during a small proportion of any azimuth scan period when the target happens to be temporarily within the receiver beam. Signals received from directions temporarily outside the receiver beam have no useful effects in such prior art systems, being cancelled by destructive interference when the signals are combined. This feature tends to make the known systems less efficient than they might be.

It is an object of the present invention to provide a radar system wherein the signals received throughout the whole duration of an azimuth scanning cycle will tend to contribute to the signals used for target location measurements, thereby tending to improve the signal-to-noise ratio of the measured signals.

According to the present invention, there is provided a radar system comprising:

A transmitter having an aerial system connected for transmitting signals substantially of a bandwith B;

A receiver having an aerial system which comprises a plurality of receiver aerial array elements for receiving reflections of the transmitter signals and is sensitive to signals incident from within a thin sheet beam;

And scanning means connected to the receiver for tilting the said thin sheet beam in a scanning motion over a predetermined arc such that the arc will be scanned at least B times per second;

Wherein the said receiver comprises a plurality of storage elements, each connected to receive signals derived from a separate one of the said receiving aerial array elements, and each comprising a narrow-bandpass tuned circuit resonant at the frequency of the said derived signals and having a bandwidth substantially equal to the bandwidth of the said derived signals;

And wherein said scanning means comprises combining means for forming output signals from an operative combination of signals developed in the said storage elements, and thereby achieving the said scanning motion.

Thus, the applicant's storage array radar systems have electronically scanned receiver aerial arrays and are distinguished by the provision of storage elements in the receiver signal channels, in which signals received during any part of the scan period have a cumulative effect tending to enhance the amplitude of the signal samples which are taken and analysed by the electronic scanning arrangement. This gives a more efficient utilisation of the signal energy received from the targets. It is only necessary to store, or accumulate, the received signals for a time of the order of the duration of one receiver scan period; in the case of the embodiment hereinafter described, this is only 10 microseconds. Hence storage elements such as delay lines, magnetic films or cores are not necessary. However, the amplitudes of the received signals must have an additive effect in the storage elements, and their phases must be preserved, as their phase is their direction-indicating property. Each storage element may comprise a narrow-band resonant filter circuit; the signals received by any one aerial of the receiver aerial array, whatever their time of arrival, all help to establish and build up an oscillation in the resonant circuit of the associated storage element. This action of the storage elements is described in detail hereinafter with reference to a specific embodiment. The relative phases of the oscillations established in the storage elements interact when they are combined in the electronic scanning arrangement to produce an output at a time within the scanning period which corresponds to the direction of incidence of the received signals. To get the best signal-to-noise ratio in the storage elements, they should have a bandwidth substantially equal to the total expected bandwidth of the received signals; if this condition is not satisfied, the benefits of the storage elements will not be fully realised.

It is another notable feature of the systems herein described that the receiver beam scan is performed at least at the Nyquist rate—that is to say, the number of receiver azimuth scan periods per second is numerically equal to the total expected bandwidth of the received signals, expressed in cycles per second. This is much faster than the scanning rate of most commonly used radar receivers. It means that a complete azimuth scan is carried out in a time no longer than one transmitter pulse. (Note: In a simple square-envelope pulse radar, the transmitted signal bandwidth is the reciprocal of the pulse duration, and in Nyquist rate scanning the sample rate equals the bandwidth; hence for this case Nyquist rate scanning means one scan for each pulse, and the azimuth scan period equal to the pulse duration.) This amounts to the concept of an azimuth scan done so quickly that it becomes effectively almost a parallel search of all azimuths simultaneously during each pulse. The azimuth scan period is made very short compared to the average propagation delay expected so that it corresponds to no more than an acceptable error (or correction) in the range measurements. This concept implies inter-relationships between the operating speeds of the various parts of the system which are very different from the corresponding relationships in previously known systems.

Obviously, the amount of power which can be supplied in a single transmitter pulse will be limited by practical considerations. Hence, if Nyquist rate scanning were adopted without the storage elements herein prescribed, so that only signals received during an appropriate small proportion of an azimuth scan are effectively utilised, then the signal to be measured would have only a small proportion of the power in a single reflected pulse, and it would tend to be very feeble indeed and liable to be lost in noise. In the present systems this weakness is compensated by the enhancement or accumulation of signal power in the storage elements. The combination of signal storage in bandpass filters with Nyquist rate scanning is, therefore, a particularly desirable combination of inventive merit. It is an advantage of the systems herein described that they allow very high scanning rates to be achieved while also alleviating the power limitations normally associated with very fast sampling.

In embodiments in which the transmitter also provides a scanning action, the use of storage elements combined with fast scanning at the Nyquist rate makes the relative timing of the transmitter and receiver scanning actions less important, and thereby overcomes difficulties associated with propagation delays. In embodiments of the present invention the transmitter may be made to scan the surveillance area in some mode quite unconnected with the operation of the receiver, without any unacceptable loss of target location information.

The fast scan may be achieved by heterodyning signals derived from the respective aerials of the receiver aerial array with a set of scan modulation signals which are all phase-locked to a common source and have frequencies related to the separations of the receiver aerials. For instance, if the receiver aerials are arranged in a straight lin, the scan modulation signals should have frequencies linearly related to the distances along the array of the associated receiver aerials. If the receiver aerials are equispaced in a straight line, the scan modulation frequencies should be related to each other like consecutive terms of an arithmetic series.

In order that the invention may be more clearly understood, an embodiment thereof will now be described, by way of example only, with reference to the accompanying drawings of which:

Figure 1:
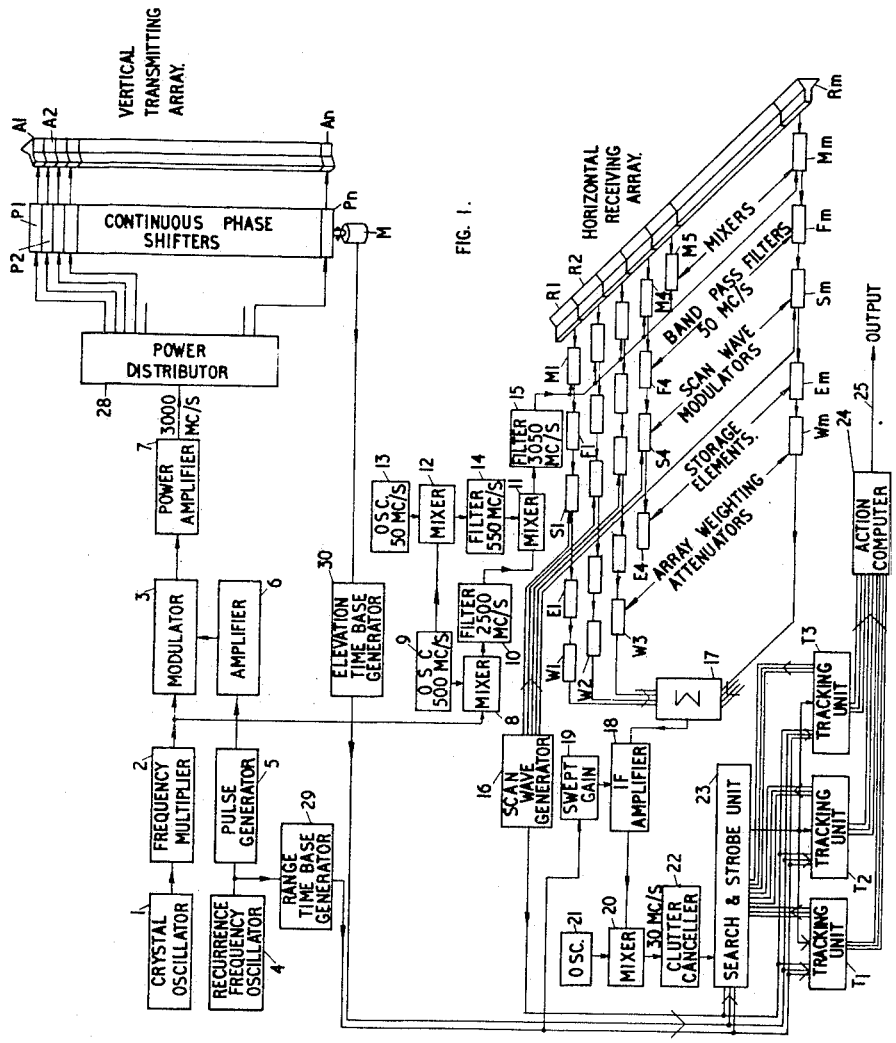
FIGURE 1 is a block circuit diagram of a radar system.

FIGURE 1 is a block circuit diagram of a radar transmitter and receiver. The transmitter comprises a crystal oscillator 1 the output of which is applied to a frequency multiplier 2 which provides an output signal having a frequency of 3,000 mc./s. The output of the frequency multiplier 2 is applied to a modulator 3 wherein the output from the frequency multiplier 2 is modulated by pulses derived from a recurrence frequency oscillator 4 and a pulse generator 5 via an amplifier 6. The output of the modulator 3 is applied to a power amplifier 7. The output of the power amplifier 7 is applied to a power distributor 28. The power distributor 28 distributes the modulated signal through a number $n$ of lines to a column of $n$ variable phase shifters P1 to P$n$. These phase shifters P1 to P$n$ are connected to $n$ aerial elements A1 to A$n$ respectively arranged in a vertical stack. The phase shifters P1 to P$n$ are controlled by an electric motor M.

The receiver has a number $m$ of aerial elements R1 to R$m$, equispaced in a straight line. These aerial elements feed $m$ mixers M1 to M$m$ respectively. The mixers M1 to M$m$ are also fed with continuous wave signals having a frequency of 3050 mc./s. in the following manner. The output from the frequency multiplier 2 in the transmitter is applied to a mixer 8 which is also fed from an oscillator 9 having a frequency of 500 mc./s. A filter 10 selects the difference frequency (2,500 mc./s.) signal at the output of the mixer 8 and applies it to another mixer 11. The output of the oscillator 9 is applied to a mixer 12 together with the output of a second oscillator 13 having a frequency of 50 mc./s. The sum frequency (550 mc./s.) signal at the output of the mixer 12 is selected by a filter 14 and applied to the mixer 11. The sum frequency (3050 mc./s.) signal at the output of the mixer 11 is selected by a filter 15 and applied to all of the mixers M1 to M$m$.

The difference frequency (50 mc./s.) signals at the outputs of the mixers M1 to M$m$ are selected by band pass filters F1 to F$m$ respectively and are applied to scan wave modulators S1 to S$m$ respectively. The scan wave modulators S1 to S$m$ are conventional modulator circuits and are controlled by outputs of a scan wave generator 16 in a manner to be described hereinafter. The scan wave generator 16 is a frequency synthesizer circuit with a multiplicity of outputs for providing different frequencies of an arithmetic series of frequencies. The outputs of the scan wave modulators S1 to S$m$ are applied to storage elements E1 to E$m$ respectively. These storage elements are band-pass filters having pass bands 100 mc./s. wide, resonant at the difference frequencies 50 mc./s. below the frequencies of the scan modulation signals. They may be constructed according to the techniques described for the construction of "echo boxes" in pages 909–934 of "Radar Systems and Components," by staff of Bell Telephone Laboratories (Van Nostrand 1949). Output signals from the storage elements E1 to E$m$ are fed through weighting attenuators W1 to W$m$ respectively to a summing circuit 17 in which the signals are added together vectorially. The output of the summing circuit 17 is applied to an intermediate frequency amplifier 18. The gain of the intermediate frequency amplifier 18 is controlled by a swept gain control unit 19. This unit is in turn controlled, by the recurrence frequency oscillator 4 via a range timebase generator 29 in the transmitter so that the gain of the intermediate frequency amplifier is progressively increased in the interval between successive pulse transmissions. Thus signals reflected from a target are subjected to an amplification proportional to the square of the range of the target. The output of the intermediate frequency amplifier 18 is applied to a mixer 20 which is also fed from an oscillator 21. The output of the mixer 20 has a centre frequency of 30 mc./s., suitable for application to a clutter canceller 22. The clutter canceller 22 may consist of one or more ultrasonic delay lines designed to combine signals and a delayed version or delayed versions thereof so that the output from the clutter canceller consists of responses substantially only from moving targets.

The output from the clutter canceller 22 is applied to a search and strobe unit 23. This search and strobe unit is also fed from the range time base generator 29 connected to the recurrence frequency oscillator 4, from an elevation time base generator 30 connected to the motor M in the transmitter and also from the scan wave generator 16 in the receiver. The nature of the search and strobe unit 23 will be discussed hereinafter.

An output of the search and strobe unit 23 is applied to three tracking units T1, T2 and T3 which also have outputs feeding back into the search and strobe unit 23. The tracking units T1 to T3 are also fed from the range time base generator 29, from the elevation time base generator 30 in the transmitter and also from the scan wave generator 16 in the receiver. Outputs from the tracking units T1 to T3 are applied to an action computer 24 which has an output 25.

The embodiment of the invention described with reference to FIGURE 1 operates in the following manner. Where necessary, reference will be made to FIGURES 2, 3, 4 and 5 to illustrate the operation of the embodiment. The aerial elements A1 to A$n$ of the transmitter are each designed to radiate the signals applied to them throughout a solid angle extending over approximately ninety degrees in azimuth and about ten degrees in elevation. The power distributor 28 is arranged to distribute the transmitter signal power to the aerial elements A1 to A$n$ so that interference effects between the radiated signals produce the effect of transmission in a fan-shaped sheet beam extending through only about one-half a degree thick in elevation (but still about ninety degrees wide in azimuth).

The continuous phase shifters P1 to P$n$ are so constructed, arranged and connected to the shaft of the motor M that they apply incremental phase shifts to the signals fed to the respective array elements and these phase shifts are linearly related to the heights of the associated array elements in the array. The ratio formed by taking the difference between the phase shifts applied to the signals feeding any two of the aerial elements and dividing it by the difference between the heights of the two aerial elements, is known as the phase slope along the array. It has the effect of tilting the transmitter beam. The motor M drives the phase shifters P1 to P$n$, thereby making the phase slope vary linearly with time so that the beam is tilted through ten degrees in elevation in a first scanning motion, providing one elevation scan cycle per second. Now, the recurrence frequency oscillator 4 operates to produce, at the output of the pulse generator 5, four hundred pulses *per* second, each of 10 microseconds duration. Thus, throughout the elevation scan, twenty pulses will be transmitted during the time taken to alter the transmitter beam tilt by one beam width (half a degree). Hence in each complete elevation scan, twenty reflected pulses should be received by the receiver aerial array from every point target within the area of surveillance of the system. The pulses are transmitted as modulation on a 3,000 mc./s. carrier. The motor M incorporates an angle transducer or like device which operates the elevation time base generator 30. The generator 30 produces a sawtooth waveform indicative of the size of the phase increments produced at any instant by the continuous phase shifters P1 to P$n$ and, therefore, indicative of the instantaneous transmitter beam elevation. This waveform, which is hereinafter called the elevation time-base, is applied to the search and strobe unit 23 and to the tracker units T1 to T3.

Figure 2:
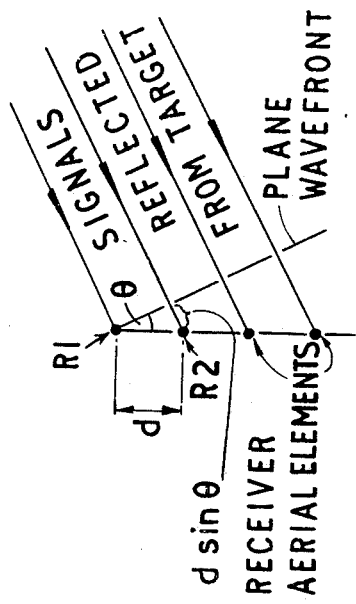
FIGURE 2 is a diagrammatic illustration showing the incidence of signals on the receiver aerials in the system of FIGURE 1, and FIGURES 3, 4 and 5 are graphical representations of signals occurring in the radar system of FIGURE 1.
Figure 3:
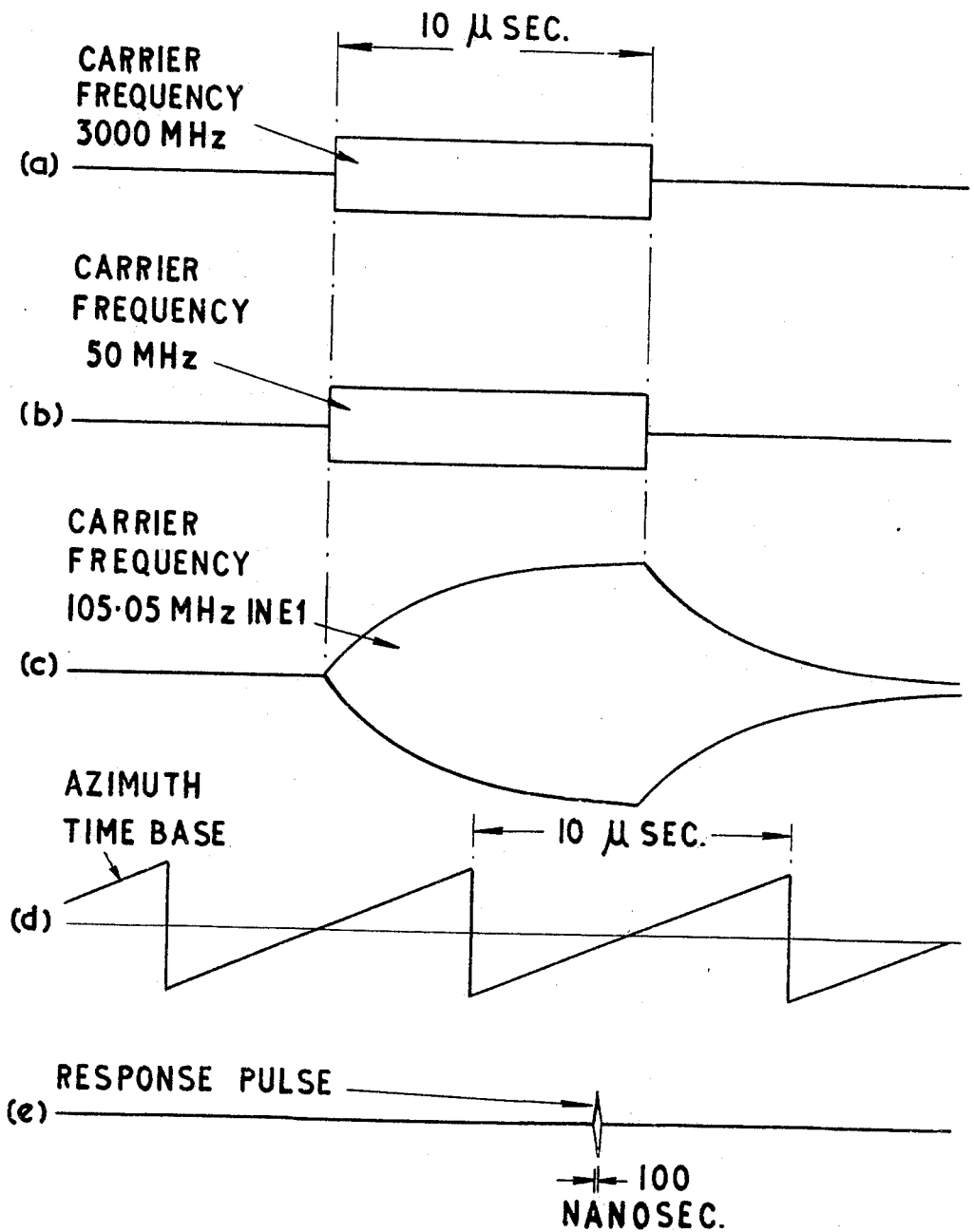

The aerial elements R1 to R$m$ of the receiver are each arranged to provide surveillance over a range of 90 degrees in azimuth and 10 degrees in elevation. There are 100 aerial elements in the array. The distance from the receiver array to any target of interest will in practice be much greater than the overall length of the receiver array, and it can therefore be assumed that the received signals are always parallel beams with plane wavefronts, as shown in FIGURE 2. The direction of incidence of the signals received from any target relative to the direction of the receiver aerial array produces a linear phase slope on the received signals—that is to say a series of phase shifts linearly dependent on distance along the receiver aerial array. The received signals all undergo a frequency change in the mixers M1 to M$n$, to a carrier frequency of 50 mHz. and are filtered in the band-pass filters F1 to F$m$, but their phase relationships are preserved. FIGURE 3 shows the modulation envelope of the received signals at (*a*) and the modulation envelope of the signals leaving the filters F1 to F$m$ at (*b*).

The azimuth scanning action, and the action of the storage elements, depend on interactions involving the phase of the carrier frequency. These interactions occur during each modulation pulse in the same way as if the carrier frequencies were present as continuous waves. The following explanation of their effects will therefore be simplified by considering the interactions as they occur within a modulation pulse.

The signals leaving the filters F1 to F$m$ may be represented by:

$$f_1 = V \sin [w_3 t + \phi + Dt]$$

$$f_2 = V \sin \left[ w_3 t - \frac{2\pi d}{\lambda} \sin \theta + \phi_0 + Dt \right]$$

$$\vdots$$

$$f_m = V \sin \left[ w_3 t - \frac{2\pi d}{\lambda} (m-1) \sin \theta + \phi_0 + Dt \right]$$

where $f_1$–$f_2 \ldots f_m$ are the signals leaving filters F1, F2 ... F$m$ respectively, V is the instantaneous amplitude of the modulation envelope, $w_3 = 10^8 \pi$ is the angular frequency of the 50 mHz. carrier, $d$ is the separation of the adjacent aerial elements in the receiver array and $\lambda$ is the carrier wavelength of the received signal. $\theta$, $\phi_0$ and D$t$ are characteristic of the target which has provided the received signal (by reflection of the transmitter signal). $\theta$ is the angle between a wavefront of the received signals and the line of the receiver aerial array, as shown in FIGURE 2. $\phi_0$ is the phase of the signal received at the element R1, which depends on the range of the target, and D$t$ is the Doppler shift which depends on the target velocity.

The factors V, $\phi_0$ and D$t$ do not significantly affect the interactions to be described, so in order to simplify the description V will be considered constant, and $\phi_0$ and D$t$ both zero. In the scan wave modulators S1 to S$_m$, the signals F1 to F$m$ are heterodyned with corresponding signals from the scan wave generator 16.

The scan wave generator 16 includes a circuit for generating a sawtooth waveform with a period of ten microseconds, and harmonic generating and mixing circuits arranged similarly to the circuits of a conventional frequency synthesiser to produce a set of signals on separate outputs, known hereinafter as the scan modulation signals. The harmonic generating circuits are driven from the sawtooth waveform, which is also used as an azimuth scan time-base as will be described hereinafter. The scan modulation signals have frequencies related to each other like the terms of an arithmetic series, being in this particular embodiment equispaced at 0.1 mHz. steps throughout the range from 155.01 mHz. to 164.95 mHz. The scan modulation signal having a frequency of 155.05 mHz. is applied to the scan wave modulator S1, the scan modulation signal having a frequency of 155.15 mHz. is applied to the scan modulator S2 and so on, the scan modulation signal having a frequency of 164.95 mHz. being applied to the one-hundredth scan wave modulator S$m$. The scan modulation signals are arranged to be co-phasic. That is to say, they are phase-locked to the sawtooth waveform from which they are all derived, and they all come into phase coincidence periodically; in the present example, once in each period of 10 microseconds. They can be represented mathematically as $s_1 = \sin w_4 t$
$s_2 = \sin [w_4 + \delta] t$
$\vdots$
$s_m = \sin [w_4 + (m-1)\delta] t$ if the time variable $t$ is measured from an instant when the scan modulation signals $s_1$ to $s_m$ are all in phase with each other. In these equations $w_4$ is the angular frequency of the 155.05 mc./s. waveform and $\delta = 2\pi/\tau_a$, where $\tau_a$ is the azimuth scan period.

The signals, $s_1$ and $f_1$, $s_2$ and $f_2$ ... $sm$ and $fm$, interact in the conventional modulators S1 to S$m$ respectively to produce useful outputs of the form $e_1 = K \cos [w_5 t]$
$e_2 = K \cos [(w_5 + \delta)t - \phi_1]$
.
.
.
$e_m = K \cos [(w_5 + \overline{m-1}\ \delta)t - (m-1)\phi_1]$ where $e_1$, $e_2$ ... $e_m$ are the output signals of the modulators $S_1$, $S_2$ ... $S_m$ respectively, K may be considered a constant in the present explanation, $w_5 = w_4 - w_3$, and $$\phi_1 = \frac{2\pi d}{\lambda} \sin \theta$$

The expressions representing these signals can also be written $e_1 = K \cos [w_5 t]$
$e_2 = K \cos [w_5 t + (\delta t - \phi_1)]$
.
.
.
$e_m = K \cos [w_5 t + (m-1)(\delta t - \phi_1)]$ The quantity $(m-1)\delta$ is much smaller than $w_5$, so that a period of time which is short compared to the azimuth scan period and in which $(m-1)\delta$ changes only slightly, may yet contain a number of cycles at the angular frequency. Over any such short period of time the signals $e_1$, $e_2$ ... $e_m$ are practically equivalent to a set of signals all of the angular frequency $w_5$, but with successively increasing phase shifts which are in each case proportional to the distance along the receiver aerial array of the receiver aerial element feeding the scan wave modulator from which the signal concerned is obtained. In other words, the effect produced is that of a linear phase slope across the array, which is proportional to $(St - \phi_1)$ and therefore varies linearly with time within each azimuth scan period. When $St$ becomes equal to $\phi_1$, or $w_5 - \phi_1$ equal to $2\pi$ the phase slope becomes zero, or in other words the signals $e_1$, $e_2$ ... $e_m$ become practically equivalent to signals of angular frequency $w_5$ all in phase with one another.

To avoid a digression, the action of the storage elements will not be considered in detail at this stage. Here, it need only be said that the storage elements E1 to E$m$ and the attenuators W1 to W$m$ do not alter the above-described phase relationships of the signals $e_1$, $e_2$ ... $e_m$. Thus when the above-described in-phase condition of the signals $e_1$, $e_2$ ... $e_m$ occurs, the signals applied to the summing circuit 17 combine additively to provide a substantial output, hereinafter referred to as the response pulse. The response pulse occurs at a time $t_a$ relative to the azimuth time-base which can (and is) used as a measure of $\phi_1$ and hence of $\theta_1$ that is to say the target azimuth angle. The arrangement of the scan modulation signals and the summing circuit 17 therefore provide the effect of a receiver beam scanning in azimuth. The attenuations provided by the attenuators W1 to W$m$ are chosen to make the effective width of the receiver beam approximately equal to one degree change in azimuth and to reduce the aerial side-lobes. The receiver beam is not a physically existing limited beam of radiation; it is a geometrical representation of the effects due to the phase relationship of the signals which are combined together, which are produced when the signals are combined together. The receiving aerials do in fact receive and pass on signals from all directions within the field surveyed by the system, but the response pulses arise as if they were due to a scan across the target by a receiver beam in the form of a thin fan-shaped vertical sheet one degree thick in azimuth and 10 degrees wide in elevation, which is scanned through 90 degrees in azimuth in each azimuth scan period of 10 microseconds. The receiver aerial elements are spaced slightly less than $0.7\lambda$ apart, so that $2\pi d/\lambda \sin \theta = \phi_1$ varies within the range from $-\pi$ to $+\pi$ and the 90 degree scan occupies practically the whole of the azimuth scan cycle. The receiver aerial elements are each arranged to have a sufficiently sharp-cut-off to their sensitivity at the angles $\theta = \pm 45$ degrees, so that ambiguities due to signals from targets outside the scanned quadrant are avoided.

Each response pulse developed at the output of the summing circuit 17 is in fact a burst of about ten cycles of a carrier frequency in the range from 105 to 114 mHz., lasting about 100 nanoseconds. FIGURE 3 shows the azimuth time base at ($d$), and the modulation envelope of a response pulse at ($e$). Because the azimuth scan period has the same duration as each transmitted pulse (10 microseconds) there will always be one, and in general only one, 100 nanosecond azimuth response pulse generated for each pulse reflected from a given target. Hence there will be one azimuth response pulse generated every 2½ milliseconds until the transmitter ceases to illuminate the target, although the azimuth time base is not synchronised with either the transmitted pulses or the reflected pulses.

Because the storage elements limit the bandwidth of the signals used to the bandwidth of the received signals, the azimuth response pulses should have a signal-to-noise ratio practically equal to the signal-to-noise ratio of the received signals.

The response pulses from the summing circuit 17 are amplified in the intermediate frequency amplifier 18, have their carrier-frequency changed to 30 mc./s. in the mixer 20, and are applied to the clutter canceller 22. The clutter canceller 22 consists of one or more ultrasonic delay lines the length of each of which is 2½ milliseconds, the interpulse interval. The original signal and the output of each delay line are combined so that cancellation occurs for targets which are stationary. The remaining signals are integrated over a period of the order of 10 seconds. This may be done by post-detection integration on one or more direct-viewing storage tubes in the search and strobe unit 23.

Figure 4:
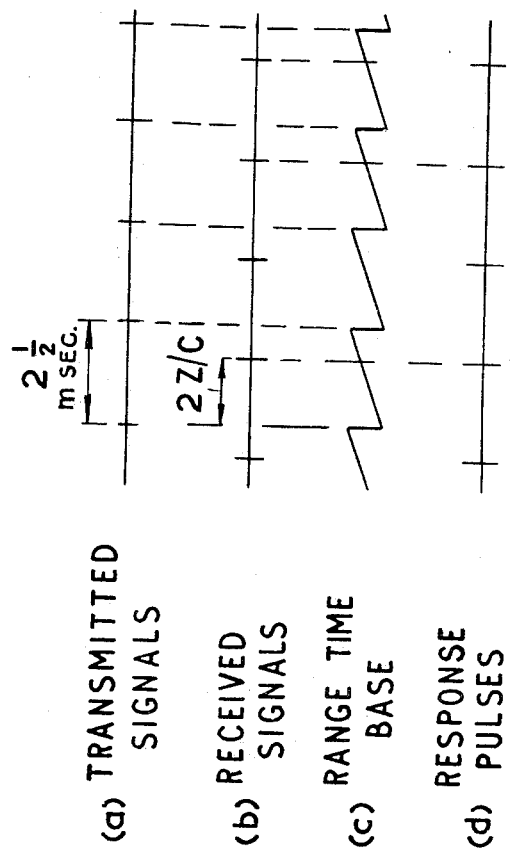
Figure 5:
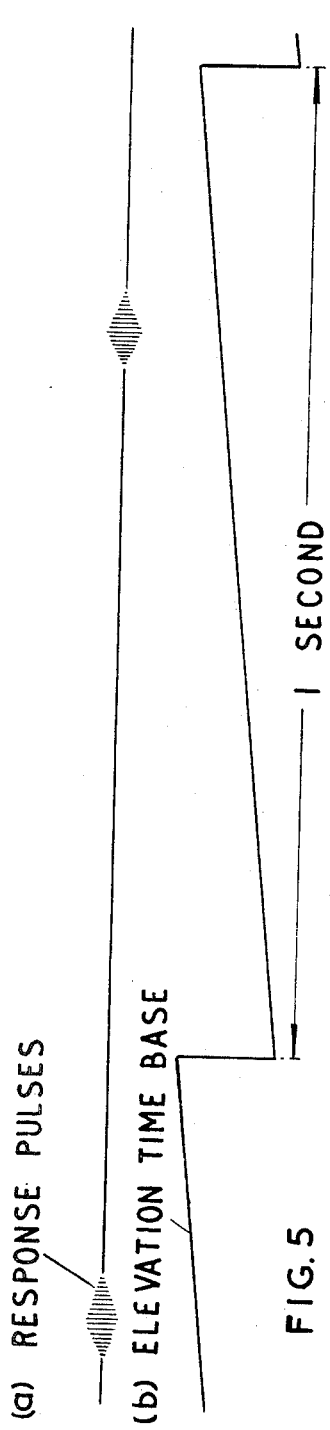

The inputs to the search and strobe unit 23 will now be summarised with reference to FIGURES 4 and 5. FIGURE 4 shows at ($a$) the transmitter signals; at ($b$) a series of signals received at the receiver aerial array by reflection from a single target; at ($c$) the range time base provided by the time base generator 29; and at ($d$) the response pulses developed at the output of the cluster canceller 22 as a result of the reception of the signals shown at ($b$). It will be noted that the time scale of FIGURE 4 makes it impossible to indicate any difference between the received signals of duration 10 microseconds and the response pulses of duration 100 nanoseconds.

FIGURE 5 shows at ($a$) the response pulses from the output of the clutter canceller 22 and at ($b$) the elevation time base provided by the time base generator 30. FIGURE 4 is drawn on a still smaller time scale than FIGURE 3, and at ($a$) the separation of the response pulses has been exaggerated for the sake of clarity.

The time base signals shown at ($d$) in FIGURE 3, at ($c$) in FIGURE 4 and at ($b$) in FIGURE 5 are applied to the search and strobe unit 23 and to the tracking units T1, T2 and T3. The response pulses from the output of the clutter canceller 22 are also applied to the search and strobe unit 23. The azimuth, range and elevation of any target are measured by the timing of the corresponding series of response pulses relative to the azimuth time base, the range time base and the elevation time base respectively.

During the 2½ millisecond periods between consecutive transmitted pulses, reflected signals will be received from targets at successively increasing ranges, out to a maximum range of about 230 miles corresponding to a propagation delay nearly equal to 2½ milliseconds. The timing of the received signals relative to the 2½ millisecond pulse recurrence period naturally depends on the propagation delay and hence on the range of the target which reflected them. In each pulse recurrence period of 2½ milliseconds, 250 azimuth scanning actions of the receiver beam will occur, each being completed in 10 microseconds and each producing one azimuth response pulse as hereinbefore described. The periods of transmission of the radar signal pulses ((a) in FIGURE 4) are synchronised with the range time base ((c) in FIGURE 4) which is provided by the range time base generator 29. The timing, relative to the range time base of the particular 10 microsecond azimuth scan period in which a response is received from a given target, will therefore give a measurement of the range of the target. The azimuth scanning arrangements will make the response pulses occur at times within the 10 microsecond azimuth scan periods which depend on the azimuthal angle of incidence of the received signals. In the present embodiment the azimuth scanning, determined by the scan wave generator 16, is not synchronised with the range time base and so the displacement of the response pulses within the azimuth scan periods creates an uncertainty of about plus or minus one mile in the range measurement. As the system is intended for measurements out to a maximum range of about 230 miles (that is 2½ milliseconds total transmission time, to the target and back again) an uncertainty of one mile is unimportant.

Thus the range measurements are made by the apparatus in an entirely conventional manner. The only unusual feature affecting range measurements in the system is the slight uncertainty in time and range measurements introduced by the azimuth scanning arrangement. This uncertainty is made unimportant because the azimuth scanning operations and the actions of the storage elements are completed so very much more quickly than the range measurements that their interference with the range measurements is negligible.

The response pulses will be repeated in successive recurence periods for as long as the target is illuminated by the transmitter aerial array. Because the transmitter beam has a width of one half a degree and scans through 10 degrees in elevation in one second, a typical single target will be illuminated for approximately one-twentieth of a second. During that time there will be approximately 20 transmitted pulses and the same number of response pulses, as shown at (a) in FIGURE 5.

The search and strobe unit 23 may comprise a number of plan position indicator-type scans, one for each half degree of elevation scan and each having rasters operated by the azimuth and range time bases. The distribution of the response signals to these scans is then made under the control of the elevation time base. An operator may select any significant signal appearing on the plan position indicator-like scans and set strobe-gating controls on one of the tracking circuits T1, T2 or T3 to define a three-dimensional cell about the associated target. Each tracking unit includes strobe gate tracking circuit for each of the three dimensions of measurement, i.e. azimuth, range and elevation, and three servo-mechanisms for controlling the strobe-gate tracking circuits to separate out the signals referring to the selected target. The operation of the three servo mechanisms maintains the strobe-gating in the search and strobe unit 23 in three dimensions, so that signals referring to other targets will interfere only if the other targets come coincidentally within the same three-dimensional cell.

Preferably the operation of strobe-gating of each target to a tracking unit gates out the response signal of that target from the corresponding plan position indicator-like scan in the search and strobe unit 23 so that an operator would not be confused by seeing responses already strobed.

The outputs of the tracking units representing the polar co-ordinates of targets are passed to the action computer 24 which calculates the trajectory and possibly other characteristics of each target.

The action of the storage elements E1 to E$m$ remains to be explained. As hereinbefore mentioned, these storage elements are resonant band-pass filters, and they have a high Q factor. The signals applied to them are bursts of radio-frequency oscillation, each lasting 10 microseconds and having carrier frequencies in the range from 105.5 mHz. to 114.95 mHz.; thus each burst comprises over a thousand cycles of the carrier frequency wave. The modulation envelope of the applied signal bursts is rectangular in form, similar to those shown at (a) and (b) in FIGURE 3.

The cumulative action of the storage elements may be most simply explained by considering that each half-cycle of the signals applied to a given storage element is capable of exciting a damped oscillation at the resonance frequency of its resonant circuit. Since the half-cycles are themselves parts of a sinusoidal waveform at the resonance frequency of the storage element concerned, they excite damped oscillations which are in phase with each other and therefore have a cumulative effect. The applied signals therefore cause an oscillation in the storage element which builds up exponentially as successive cycles of each burst of applied signals add their contribution to the effects of the preceding cycles. The action is of the kind shown for instance in FIGURE 10 on page 357 of "Electric Circuits," a text-book by staff of the Massachusetts Institute of Technology, published by John Wiley, New York, 1944. In the present case, because of the high Q factor of the storage element circuits, the exponential build-up continues for a considerable time and is not quite complete when the applied signal ceases at the end of the burst. The oscillation in the resonant circuit then decays exponentially, like any ordinary damped oscillation. Thus the signal in the storage element has an envelope as shown at (c) in FIGURE 3.

The inclusion of the storage elements achieves several advantages which will now be explained. Firstly, it gives a more efficient utilisation of the received signals, which is equivalent to a substantial increase in the receiver sensitivity or the transmitter power. Without the storage elements, the received signals would only be utilised during the 100 nanosecond periods when the azimuth scanning arrangements provide the correct conditions for the generation of a response pulse. Signals received outside these periods would be merely dissipated with destructive mutual interference at the summing circuit 17. In contrast, when the storage elements are included, they enable the signals received throughout a large part of an azimuth scanning period to contribute to and enhance the signals on which the azimuth measurements are made. Each response pulse is enhanced by energy received throughout the part of the received burst preceding the generation of the response pulse. Since the azimuth time base is not synchronised with the received signal bursts, signals from all azimuths within the area of surveillance will receive substantially the same benefit from the storage action, on average over a number of scans.

The above-described more efficient utilisation of the received signals is particularly desirable when very fast scanning (e.g., scanning at the Nyquist rate) is required. Though otherwise desirable, very fast scanning requires short response pulses, and therefore tends to limit the power available for each measurement and to reduce the signal-to-noise ratio rather drastically. The greater efficiency of a receiver including storage elements helps to avoid this trouble and helps to make faster scanning rates practicable.

Secondly, since the bandwidth of the storage elements is made substantially equal to the received signal bandwidth, they considerably improve the signal-to-noise ratio.

It will be readily understood by those versed in the art that the above-described embodiment has been described by way of example only and that the invention may be carried out in various alternative ways. For example, the beam direction of the receiver aerial array may be scanned at a rate greater than the Nyquist rate. The transmitter scan may be obtained by the use of a nodding mirror or by the mechanical oscillation, or the switching, of feeds into a fixed mirror or lens. The transmitter aerial array may be arranged to provide a scan in azimuth whilst the receiver aerial array may be arranged to scan in elevation. However, it will always be the receiver scan which will operate at a rate equal to or greater than the Nyquist rate. The storage elements E1 to E$m$, each having an appropriate centre-frequency and a band width determined by the bandwidth of the received signals, may be inserted anywhere in the receiver circuits between the aerial array R1 to R$m$ and the summing circuit 17. For instance, the band-pass filters F1 to F$m$ could be used as storage elements, if their bandwidth is suitably reduced. In this case the filters E1 to E$m$ need only be selective enough to select the appropriate outputs of the modulators S1 to S$m$.

The clutter canceller 22 may be omitted from the receiver circuits together with the oscillator 21 and the mixer 20. The spacind $d$ of the receiver aerial elements may be chosen to give a desired azimuth scanning arc greater than 90 degrees. Alternatively, the transmitter aerial array A1 to A$n$ may be replaced by an aerial arrangement giving a full 360 degrees coverage in azimuth. In this case, the receiver aerial array R1 to R$m$ may be replaced by a ring of aerials so energised that the receiver beam scans a full 360 degrees in one scan period.

In a modification of the present invention, the Nyquist rate sampling of the receiver aerial array (that is to say, the Nyquist rate scanning of the beam direction of the receiver aerial array) is not carried out by cophasic signals having an arithmetic series of frequencies but is made along the array elements in time by electronic switches driven by a ring counter, preferably at twice the Nyquist rate. This then produces signals the frequencies of which are related to the directions of reception of signals from reflecting targets. These frequencies may then be converted by known means into a series of pulses the time phases of which are characteristic of the directions of reception. The storage elements are in this case connected in the signal paths between the aerials and the electronic switches.

I claim:
1. A radar system comprising:
   a transmitter having an aerial system connected for transmitting signals substantially of a bandwidth B,
   a receiver having an aerial system which comprises a plurality of receiver aerial array elements for receiving reflections of the transmitter signals and is sensitive to signals incident from within a thin sheet beam,
   and scanning means connected to the receiver for tilting the said thin sheet beam in a scanning motion over a predetermined arc such that the arc will be scanned at least B times per second,
   wherein the said receiver comprises a plurality of storage elements, each connected to receive signals derived from a separate one of the said receiving aerial array elements, and each comprising a narrow-bandpass tuned circuit having a bandwidth substantially equal to the bandwidth of the said derived signals,
   and wherein said second scanning means comprises combining means for forming output signals from an operative combination of signals developed in the said storage elements, and thereby achieving the said scanning motion.

2. A radar system as claimed in claim 1 and wherein the receiver comprises:
   a set of mixer circuits each connected to a separate one of the receiver aerial array elements, and
   a local oscillator connected to all of the mixer circuits, and wherein the storage elements are each connected to receive signals derived from a separate one of the mixer circuits.

3. A radar system comprising:
   a transmitter having an aerial system connected for transmitting signals substantially of bandwidth B in a first thin sheet beam,
   first scanning means connected to the transmitter for tilting the said first thin sheet beam in a first scanning motion,
   a receiver having an aerial system which comprises a plurality of receiver aerial array elements for receiving reflections of the transmitter signals, and is sensitive to signals incident from within a second thin sheet beam intersecting the said first thin sheet beam, and second scanning means connected to the receiver for tilting the said second thin sheet beam in a second scanning motion over a predetermined arc such that the arc will be scanned at least B times per second,
   and wherein the said receiver comprises a plurality of storage elements, each connected to receive signals derived from a separate one of the said receiving aerial array elements, and each comprising a narrow-bandpass tuned circuit having a bandwidth substantially equal to the bandwidth of the said derived signals,
   and wherein said second scanning means comprises combining means for forming output signals from an operative combination of signals developed in the said storage elements, and thereby achieving the said second scanning motion.

4. A radar system as claimed in claim 3 and wherein the said second scanning means comprises
   a scan wave generator means, having a set of outputs arranged in a given order, for developing on the said outputs a corresponding set of modulation signals which, taken in the order to the said outputs on which they are developed, have frequencies related to each other as the terms of an arithmetic series taken in order, and which are all phase-locked to a signal within the scan wave generator means,
   and a plurality of scan wave modulators, each connected to a separate one of the said outputs of the scan wave generator means and arranged in a corresponding order, and respectively connected each in a separate one of the signal paths leading to the said combining means from the said receiver aerial array elements taken in a corresponding order.

5. A radar system as claimed in claim 4 and wherein there is provided a search and strobe unit connected to receive a time base waveform from said scan wave generator and to receive signals from said receiver aerial array, the time base waveform being in synchronism with the scan of the beam direction of said receiver aerial array.

6. A radar system as claimed in claim 5 and wherein the said transmitter transmits periodic radio-frequency pulses and wherein there is provided a range time base generator connected to said transmitter and to said search and strobe unit for providing a time base waveform in synchronism with the times of transmission of pulses.

7. A radar system as claimed in claim 6 and wherein there is provided a time base generator connected to said first scanning means and to said search and strobe unit for producing a time base waveform in synchronism with said first scanning means.

8. A radar system as claimed in claim 3 and wherein the said transmitter aerial system includes an array of aerial elements and said first scanning means includes a plurality of continuous phase shifters connected one in each signal path to said aerial elements, the continuous phase shifters being connected in unison to an electrical motor to provide a continuously varying linear phase slope to signals applied to said aerial elements.

9. A radar system as claimed in claim 3 and wherein the said first angular dimension lies in a vertical plane and the said second angular dimension lies in a horizontal plane.

10. A radar system as claimed in claim 7 and wherein the said first angular dimension lies in a vertical plane and the said second angular dimensions lies in a horizontal plane.

11. A radar system as claimed in claim 3 and wherein there are provided a summing circuit and a scan wave generator having a plurality of outputs at a substantially cophasic arithmetic series of frequencies and wherein each receiver aerial array element is connected to said summing circuit through a mixer, a band pass filter, a scan wave modulator, a storage element and a weighting attenuator, each mixer being connected to a source of local oscillations and each scan wave modulator being connected to a separate one of the outputs of said scan wave generator.

No references cited.

RODNEY D. BENNETT, JR., Primary Examiner

J. P. MORRIS, Assistant Examiner

U.S. Cl. X.R.

343—16